(12) United States Patent
Gray

(10) Patent No.: US 9,329,824 B2
(45) Date of Patent: May 3, 2016

(54) METHODS AND SYSTEMS FOR DETERMINING AND DISPLAYING PRINTING DEVICE ENERGY SAVINGS

(75) Inventor: Simon John Gray, Bedfordshire (GB)

(73) Assignee: Xerox Corporation, Norwalk, CT (US)

( * ) Notice: Subject to any disclaimer, the term of this patent is extended or adjusted under 35 U.S.C. 154(b) by 92 days.

(21) Appl. No.: 13/229,019

(22) Filed: Sep. 9, 2011

(65) Prior Publication Data

US 2013/0063756 A1 Mar. 14, 2013

(51) Int. Cl.
*G06K 15/00* (2006.01)
*G06F 3/12* (2006.01)
*G06F 1/32* (2006.01)

(52) U.S. Cl.
CPC ............ *G06F 3/1285* (2013.01); *G06F 1/3284* (2013.01); *G06F 3/1221* (2013.01); *G06F 3/1262* (2013.01); *G06F 3/1273* (2013.01); *Y02B 60/1267* (2013.01); *Y02B 60/1271* (2013.01)

(58) Field of Classification Search
CPC .................................................... G06F 1/3284
USPC .......................................... 358/1.15
See application file for complete search history.

(56) References Cited

U.S. PATENT DOCUMENTS

| 2010/0214593 A1* | 8/2010 | Toda | H04N 1/00214 358/1.14 |
| 2011/0116108 A1* | 5/2011 | Ha | G06F 3/1219 358/1.2 |
| 2011/0261405 A1* | 10/2011 | Ito | G06F 1/3203 358/1.15 |

* cited by examiner

*Primary Examiner* — Tammy Pham
*Assistant Examiner* — Bharatkumar Shah
(74) *Attorney, Agent, or Firm* — Fox Rothschild LLP

(57) ABSTRACT

A system and method for determining and displaying energy saving information associated with a printing device, including a processor and a computer-readable non-transitory storage medium operably connected to the processor. The computer-readable non-transitory storage medium contains a set of instructions that, when executed, instruct the processor to determine a first energy usage by the printing device in a normal operating mode, determine at least one second energy usage for the printing device in at least one energy saving mode, compare the first energy usage and the at least one second energy usage, determine at least one energy savings based upon the comparison, and cause the at least one energy savings to be displayed.

12 Claims, 4 Drawing Sheets

METHODS AND SYSTEMS FOR DETERMINING AND DISPLAYING PRINTING DEVICE ENERGY SAVINGS

BACKGROUND

The present disclosure relates to information collection and presentation. More specifically, the present disclosure relates to printing device energy savings information collection and presentation.

Many office devices such as printers, copiers and multi-function devices (e.g., a single device capable of scanning, printing, faxing and/or copying) are capable of operating in one or more energy saving modes. For example, when a device is not used for a given period of time, the device may enter a "sleep" mode.

During energy saving modes, the device uses less overall power as compared to normal operating mode and, thus, saves energy costs and various other resources. However, a user of the device has to endure performance losses associated with production losses from energy saving mode. In some instances, the production losses may be of a larger value than the energy or resource savings. As such, a user or an administrator for the device may disable energy saving mode as a means to reduce lost productivity.

SUMMARY

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this document is to be construed as an admission that the embodiments described in this document are not entitled to antedate such disclosure by virtue of prior invention. As used in this document, the term "comprising" means "including, but not limited to."

In one general respect, the embodiments disclose a system for determining and displaying energy saving information associated with a printing device. The system includes a processor and a computer-readable non-transitory storage medium operably connected to the processor. The computer-readable non-transitory storage medium contains a set of instructions that, when executed, instruct the processor to determine a first energy usage by the printing device in a normal operating mode, determine at least one second energy usage for the printing device in at least one energy saving mode, compare the first energy usage and the at least one second energy usage, determine at least one energy savings based upon the comparison, and cause the at least one energy savings to be displayed.

In another general respect, the embodiments disclose a method of determining and displaying energy saving information for each of one or more energy saving modes associated with a printing device. The method includes determining, by a processor, a first energy usage by the printing device in a normal operating mode; determining, by the processor, at least one second energy usage for the printing device in at least one energy saving mode; comparing, by the processor, the first energy usage and the at least one second energy usage; determining, by the processor, at least one energy savings based upon the comparing; and displaying, by a display device operably connected to the processor, the at least one energy savings.

In another general respect, the embodiments disclose a printing device for determining and displaying energy saving information associated with the printing device. The printing device includes a processor, a power supply operably connected to the processor and configured to measure power consumed by the printing device and transmit a power value to the processor, the power value indicative of the power consumed, and a computer-readable non-transitory storage medium operably connected to the processor. The computer-readable non-transitory storage medium contains a set of instructions that, when executed, instruct the processor to receive the power value from the power supply, determine a first energy usage by the printing device in a normal operating mode based upon the power value, determine at least one second energy usage for the printing device in at least one energy saving mode based upon the power value, compare the first energy usage and the at least one second energy usage, determine at least one energy savings based upon the comparison, and cause the at least one energy savings to be displayed.

DETAILED DESCRIPTION

A "printing device" is an electronic device that is capable of receiving commands, and/or printing text characters and/or images on a substrate, and/or scanning images. Printing devices may include, but are not limited to, network printers, production printers, copiers and other devices using ink or toner, and scanners. A printing device may also perform a combination of functions such as printing and scanning, in which case such a device may be considered a multifunction device.

A "computing device" refers to a device that processes data in order to perform one or more functions. A computing device may include any processor-based device such as, for example, a server, a personal computer, a personal digital assistant, a web-enabled phone, a smart terminal, a dumb terminal and/or other electronic device capable of communicating in a networked environment. A computing device may interpret and execute instructions.

A "printer driver" refers to a set of computer instructions operably configured to instruct a processor of a printing device to process and print a document or print job.

A "print job" is one or more documents accessed at a computing device and requested by a user to be printed or otherwise processed at a printing device.

During an energy saving mode, various components in a printing device go into low power operation or are turned off completely. For example, a copier's fuser may be turned off, motor drives and controllers may be shut off, and communication interfaces may be put into a low power, low speed mode. Once the device receives a request to perform a specific function, the device may exit sleep mode and operate as normal.

Some office devices may also include one or more energy saving modes that are designed to utilize less power and other resources than normal operating mode while attempting to reduce any impact on the productivity of the office device. For example, an office device may include an economy print mode where less ink or toner is used. Similarly, an office device may include a batching print mode where a print job is only processed after a set number (e.g., 20) of print jobs are received by the device. This limits the number of times the office device is functioning in print mode, thereby reducing the overall power consumed and resources used.

Many modern office devices include sophisticated drivers or software configured to operate various functions of the device. Often, one or more drivers monitor energy consumption and power used by the device. However, in prior art devices, this information is not provided to a user or operator of the device in an easily accessible, or easily readable, manner.

Figure 1:
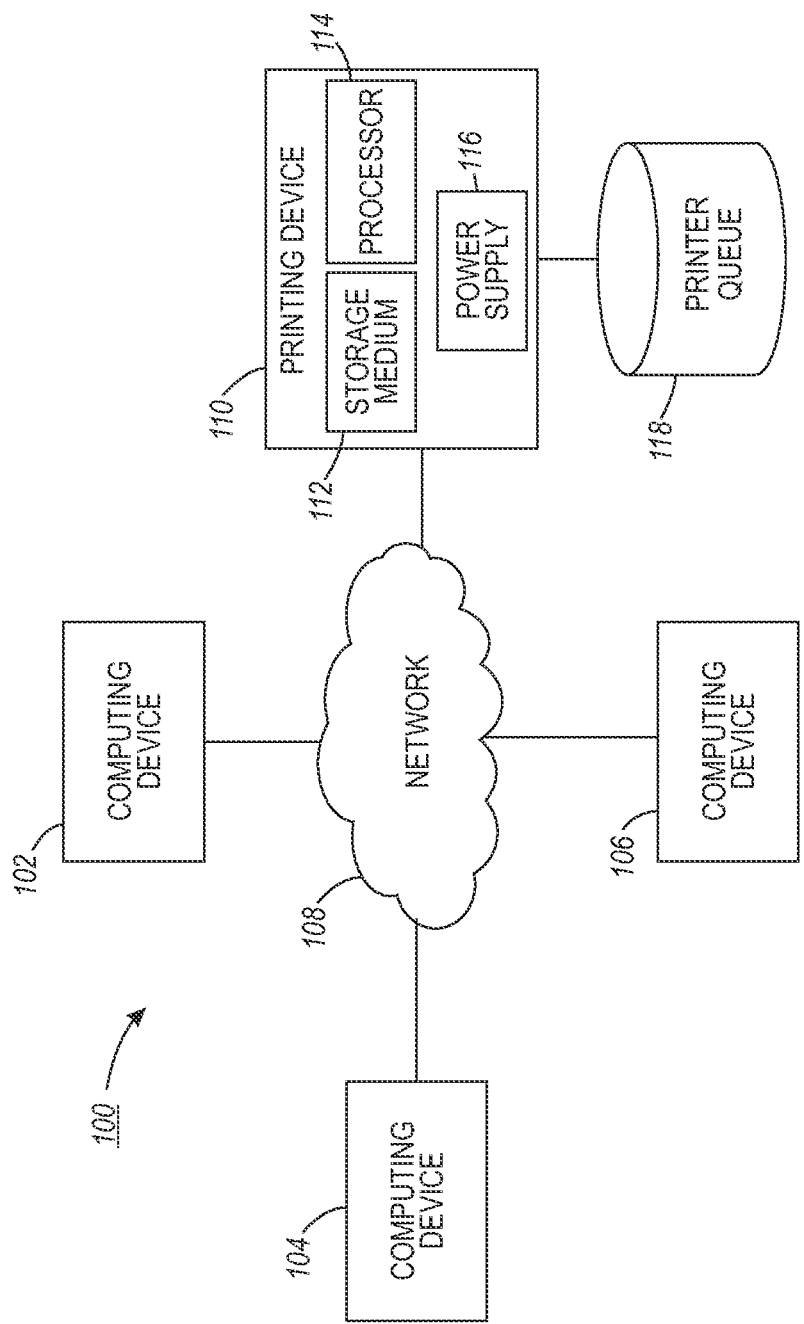
FIG. 1 illustrates an exemplary office environment including multiple computing devices and a printing device according to an embodiment.

FIG. 1 illustrates a block diagram of an exemplary system 100 for accessing a single printing device from various computing devices. As shown in FIG. 1, the system 100 may include multiple computing devices 102, 104, and 106, operably connected to a printing device 110 via a network 108. The network 108 may include, but is not limited to, a local area network (LAN), a wide area network (WAN), the Internet, an intranet and/or any other communications network. It should be noted that a single printing device 110 is shown by way of example only. In a typical system, multiple printing devices may be utilized; however, to simplify the example, a single printing device 110 will be discussed. The printing device 110 may include a computer readable non-transitory storage medium 112 configured to store one or more printer drivers as well as a processor 114 operably connected to the storage medium. The one or more printer drivers may instruct the processor 114 to perform various functions such as printing a document. Similarly, the one or more printer drivers may also monitor energy usage at the printing device 110 and store this information in the storage medium 112.

As discussed above, in a typical system, a user wishing to print a document from one of the computing devices 102, 104, or 106 would access a printer driver configuration page for printing device 110. When the user selects to print the document, the associated print job may be placed in a printer queue 118 for processing and printing. The printer queue 118 may be a storage device integrated in the printing device, such as storage medium 112, and operably connected to the processor 114 of the printing device. Alternatively, the printer queue 118 may be a storage device remotely located in, for example, a print server and operably connected to the printing device 110 via a communications network.

The printing device 110 may be configured to operate in one of several modes. For example, the printing device may operate in normal operating mode or in an energy saving mode. For example, energy saving modes may include, but are not limited to, an economy print mode (e.g., a mode where quality of the printing is reduced), a low speed mode (e.g., a mode where a low speed network connection is used), a batch printing mode (e.g., a mode where print jobs are only performed once a certain number of jobs are stored in the print queue), and other related energy saving modes. An individual energy saving mode may encompass two or more other energy saving modes. For example, the printing device 110 may include a maximum energy saving mode which includes all of the above-listed energy saving modes.

A power supply 116 of the printing device 110 may include software such as a dedicated driver configured to monitor the power used by the printing device. The power supply 116 may monitor, measure and record power consumption during a normal operating mode as well as each of the energy saving modes. The power supply 116 may store the measured power consumption levels in a memory, such as storage medium 112, shared with the processor 114 of the printing device 110, or the power supply 116 may transmit the measured power levels to the processor for further processing. Additional software at the printing device 110 may instruct the processor 114 to calculate energy savings for each of the energy saving modes based upon the measured power levels and display this information.

Figure 2:
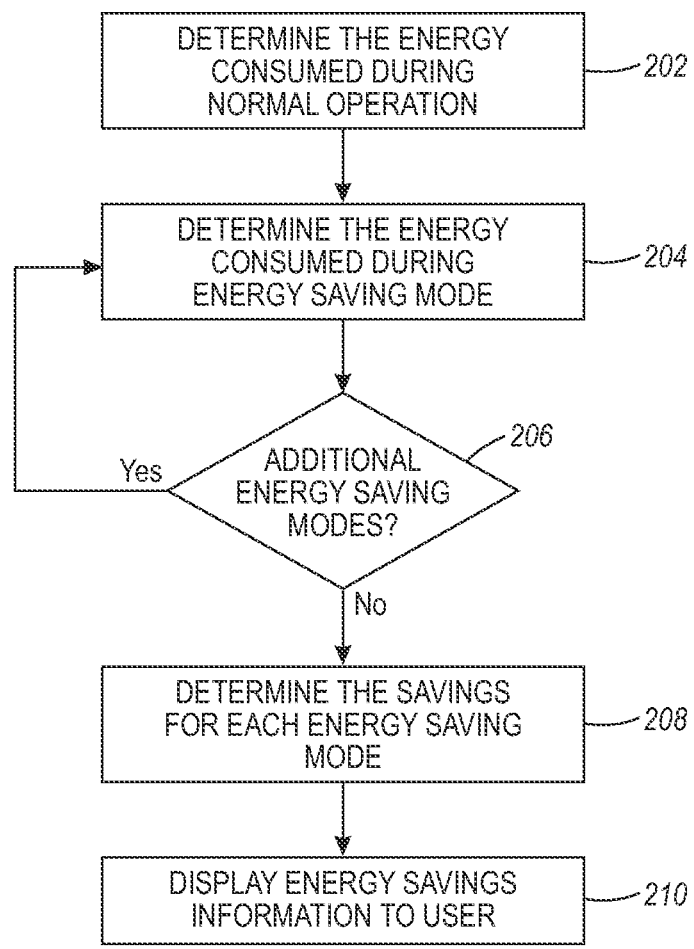
FIG. 2 illustrates an exemplary flow diagram of a method for determining potential energy savings at a printing device according to an embodiment.

FIG. 2 illustrates a flow diagram of an exemplary method for determining energy savings related to using energy saving modes at a printing device, e.g., printing device 110, and displaying the energy savings. During initialization or configuration, the printing device may determine 202 an amount of energy consumed or otherwise used by the printing device during normal operating mode. For example, the printing device may perform various tasks such as scanning, copying and/or printing under normal conditions, measuring the energy used during the task at the power supply of the printing device and determining 202 the total energy used during the normal operating mode. Similarly, the printing may determine 204 the total energy consumed for performing the same task in an energy saving mode. For example, the printing device may determine 204 the total energy consumed for performing the same task in an economy printing mode. Based upon the software and capabilities of the printing device, multiple energy saving modes may be accessible to the printing device. The printing device may determine 206 if there are additional energy saving modes the task can be performed in. If there are additional modes, the printing device may determine 204 the energy consumption for those modes as well. To continue the above example, in addition to economy printing mode, the printing device may include a batch printing mode. The printing device may determine 204 the energy that would be consumed for performing the task in batch printing mode. Similarly, the printing device may include a low-speed, low-power connectivity mode. The printing device may determine 204 the energy that would be consumed for performing the task in the low-speed, low-power connectivity mode.

If the printing device determines 206 there are no additional energy saving modes, the printing device may determine 208 an estimated energy savings for each of the identified energy saving modes. The determination 208 may include comparing the determined 202 energy for performing a task in normal operation mode versus the determined 204 energy for performing the same task in each energy saving mode. The determination 208 may further include subtracting the determined 204 energy for performing a task in each energy saving mode from the determined 202 energy for performing a task in normal operation mode.

The energy savings may be displayed 210 such that a user can consider the energy savings when choosing how to operate the printing device. For example, if the energy savings are significant, the user may opt to set the printing device to default to low-speed, low-power connectivity mode.

The energy savings may be displayed on a user interface display integrated into the printing device itself for review during initialization or configuration of the printing device. Alternatively, the energy savings may be displayed to a user on a remote computing device such as one of computing devices 102, 104 and 106. When printing a document or otherwise forwarding a print job to a printing device, a user may be prompted to select an energy saving mode. Each of the energy saving mode selections (e.g., via a drop down menu or a list including radio buttons) may include the energy saving information for reference by the user when making their selection.

For example, a user may choose to print a document. When accessing the print configuration menu on their computing device, the user may have the option to select a printing device, such as printing device 110. The user may also have the choice to select a printing mode such as normal operating mode or one of several energy saving modes. Each of the energy saving modes may include the energy saving information, such as cost savings for printing the document. Alternatively, as discussed above, an administrator may set the printing device to default to a specific energy saving mode. The user wishing to print the document may be able to change the default setting if the user has proper authorization from the administrator.

In an alternative embodiment, a calculation may be performed to determine actual cost savings at the printing device. A specific energy cost (e.g., price per kilowatt hour) may be stored at the printing device. The amount of energy saved by using an energy saving mode may then be converted directly into a cost savings and displayed 210. Similarly, the concepts discussed above may be applied to additional modes of the printer. For example, savings related to green printing modes, such as duplexing or printing in lower resolutions, may be displayed.

The process as described in FIG. 2 may be repeated for each task the printing device is capable of performing. For example, if the printing device is a multi-function device capable of scanning, faxing, printing and copying, estimated energy savings may be calculated for each task as performed in each of the energy saving modes.

In a specific example, an office may purchase a multifunction printing device capable of printing, scanning, faxing and copying documents. The printing device may include various modes of operation including normal operating mode and several energy saving modes. When configured, an administrator may set up the printing device to function in normal operating mode during all business hours to maximize the productivity of the printing device, regardless of the energy costs associated with normal operating mode. However, when a user selects to use the printing device, depending on the task selected by the user, the printing device may display the potential cost or energy savings for performing that task in an energy saving mode. Based upon this information, the user may select one or more of the energy saving modes.

For example, a user may select to print a document. The printing device may display the savings for printing the document in economy mode, the savings for printing the document in low-speed mode, and the savings for printing the document in a batch printing mode. The user may opt to select one or more of the energy saving modes based upon the displayed information.

Alternatively, the administrator may set the printing device to always function in an energy saving mode such as batch printing mode. When a user selects to print a document, the printing device may display information related to the batch printing mode such as energy or cost savings associated with batch printing. The user may be given the option to override the batch printing mode, instead printing the document in normal operating mode. The printing device may be further configured to organize users into specific groups, each group having certain rights. For example, managers may be placed into a group where they have the option to override the energy saving modes. Conversely, hourly employees may not have the option to override the energy saving modes.

Figure 3:
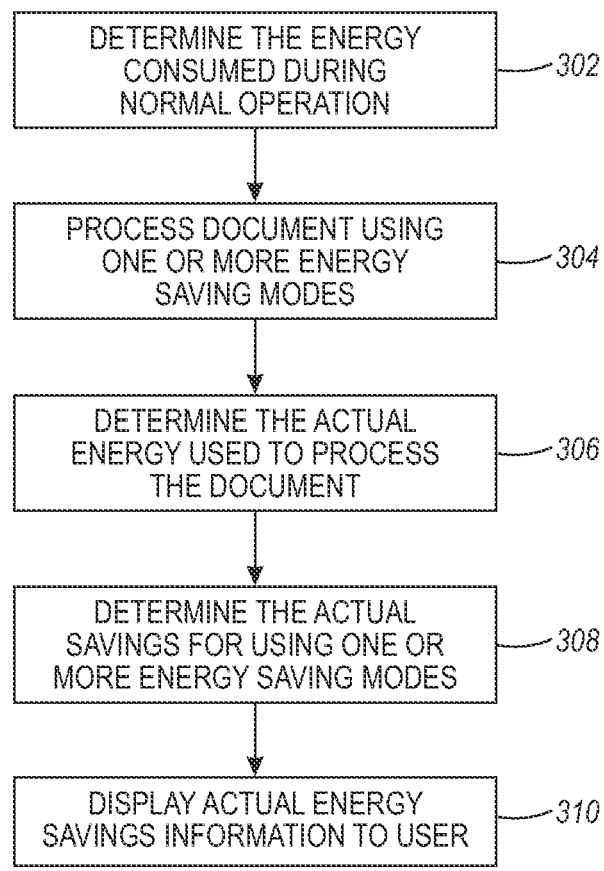
FIG. 3 illustrates an exemplary flow diagram of a method for determining actual energy savings at a printing device according to an embodiment.

In an alternative embodiment, a printing device may display actual cost savings to a user based upon one or more energy saving modes used by the user. Referring to FIG. 3, a user may send a document to be printed to a printing device. The user may select one or more energy saving modes to process and print the document. For example, the user may select batch printing and duplex printing. The printing device may determine 302 the energy that would be consumed during normal operation to print the document. A determination 302 may be performed when the printing device is initialized and scaled accordingly for each document received for processing. Alternatively, the printing device may determine 302 the energy used during normal operation for each document as it is received.

The printing device may process 304 the document using the one or more energy saving modes selected by the user. After processing, the printing device may determine 306 the actual energy used to process the document using the one or more energy saving modes. Based upon the determined 306 actual energy used, the printing device may determine 308 an actual energy savings for processing the document using the user selected energy saving modes. The determination 308 may include comparing the determined 302 energy for processing the document in normal operation mode versus the determined 306 actual energy used to process the document using the energy saving modes. The determination 308 may further include subtracting the determined 306 actual energy used from the determined 302 energy for processing the document in normal operation mode.

The energy savings may be displayed 310 such that a user can see their savings as a result of selecting the energy saving modes. For example, if the energy savings are significant, the user may opt to set the printing device to default to one or more energy saving modes. Similarly, the user may opt to personally continue using the energy saving modes.

Figure 4:
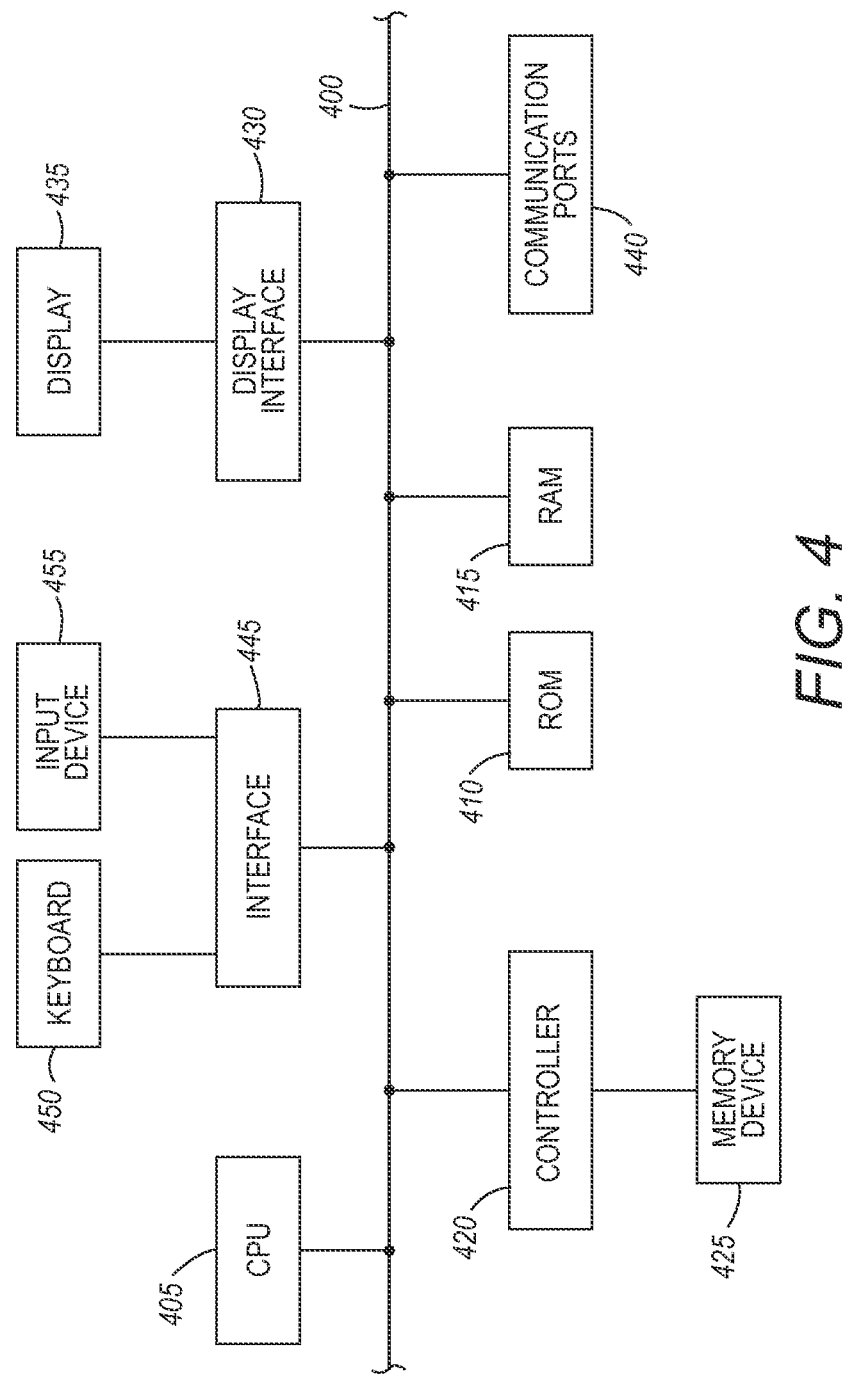
FIG. 4 illustrates various embodiments of a computing device for implementing the various methods and processes described herein.

The energy savings calculations as described above may be performed by the printing device at start-up or at determined time intervals. FIG. 4 depicts a block diagram of exemplary internal hardware that may be used to contain or implement the various computer processes and systems as discussed above. A bus 400 serves as the main information highway interconnecting the other illustrated components of the hardware. CPU 405 is the central processing unit of the system, performing calculations and logic operations required to execute a program. CPU 405, alone or in conjunction with one or more of the other elements disclosed in FIG. 4, is an exemplary processing device, computing device or processor as such terms are used within this disclosure. Read only memory (ROM) 410 and random access memory (RAM) 415 constitute exemplary memory devices.

A controller 420 interfaces with one or more optional memory devices 425 to the system bus 400. These memory devices 425 may include, for example, an external or internal DVD drive, a CD ROM drive, a hard drive, flash memory, a USB drive or the like. As indicated previously, these various drives and controllers are optional devices. Additionally, the memory devices 425 may be configured to include individual files for storing any software modules or instructions, auxiliary data, common files for storing groups of results or auxiliary, or one or more databases for storing the result information, auxiliary data, and related information as discussed above.

Program instructions, software or interactive modules for performing any of the functional steps associated with the operation of the printer driver(s) above may be stored in the ROM 410 and/or the RAM 415. Optionally, the program instructions may be stored on a tangible computer readable non-transitory storage medium such as a compact disk, a digital disk, flash memory, a memory card, a USB drive, an optical disc storage medium, such as a Blu-Ray™ disc, and/or other non-transitory recording medium.

An optional display interface 430 may permit information from the bus 400 to be displayed on the display 435 in audio, visual, graphic or alphanumeric format. The information may include information related to a current job ticket and associated tasks. Communication with external devices may occur using various communication ports 440. An exemplary communication port 440 may be attached to a communications network, such as the Internet or a local area network.

The hardware may also include an interface 445 which allows for receipt of data from input devices such as a keyboard 450 or other input device 455 such as a mouse, a joystick, a touch screen, a remote control, a pointing device, a video input device and/or an audio input device.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A system for determining and displaying energy saving information associated with a printing device, the system comprising:
   a processor;
   a first printing device operably connected to the processor and configured to receive a print job and process a document contained within the print job in at least one of a plurality of energy saving modes, wherein: the first printing device comprises a power supply configured to measure consumed power, and
   the plurality of energy saying modes comprise a low speed operating mode, a batch printing mode, and an economy print mode; and
   a computer-readable non-transitory storage medium operably connected to the processor, wherein the computer-readable non-transitory storage medium contains a set of instructions that, when executed, instruct the processor to:
   determine a first energy usage by the first printing device for processing the document in a normal operating mode,
   determine an estimated energy usage by the first printing device for processing the document in each of the plurality of energy savings modes,
   determine and display an estimated energy saving for each of the plurality of energy saving modes,
   receive a user selection of one of the energy saving modes for processing the first document,
   process the document in the user-selected energy saving mode via the first printing device,
   receive an actual power value from the power supply indicative of an actual power amount consumed by the first printing device for processing the document in the user-selected energy saving mode,
   determine at least one actual energy usage based upon the actual power amount that was consumed by the first printing device during the processing of the document in the user-selected energy saving mode,
   compare the first energy usage and the at least one actual energy usage,
   determine at least one actual energy cost savings based upon the comparison for processing the document at the first printing device using the user-selected energy saving mode and a per-unit energy cost, and
   cause the at least one actual energy cost savings to be displayed.

2. The system of claim 1, further comprising a communications interface operably connected to the processor and configured to establish an operable connection to at least one computing device.

3. The system of claim 2, wherein the set of instructions is further configured to instruct the processor to transmit the at least one energy cost savings to the at least one computing device.

4. The system of claim 3, wherein causing the at least one energy cost savings to be displayed comprises causing the at least one energy savings to be displayed on the at least one computing device.

5. A method of determining and displaying energy saving information for each of one or more energy saving modes associated with a first printing device, the method comprising:
   determining, by a processor operably connected to the first printing device, an estimated energy usage by the first printing device for processing the document in each of the plurality of energy savings modes, wherein the plurality of energy saving modes comprise a low speed operating mode, a batch printing mode, and an economy print mode;
   determining and displaying, by the processor, an estimated energy saving for each of the plurality of energy saving modes;
   receiving, at the processor, a user selection of one of the energy saving modes for processing the first document;
   processing, by the first printing device, a document in the user-selected energy saving mode;
   determining, by the processor, a first energy usage by the first printing device for processing the document in a normal operating mode;
   receiving, by the processing device, an actual power value indicative of an actual power amount consumed by the first printing device for processing the document in the user-selected energy saving mode, wherein the actual power value is received from a power supply associated with the first printing device and configured to measure power consumed by the first printing device;
   determining, by the processor, at least one actual energy usage based upon the actual power amount that was consumed by the first printing device for processing the document in the user-selected energy saving mode;
   comparing, by the processor, the first energy usage and the at least one actual energy usage;
   determining, by the processor, at least one actual energy cost savings for processing the document at the first printing device using the user-selected energy saving mode based upon the comparing and a per-unit energy cost; and
   displaying, by a display device operably connected to the processor, the at least one actual energy cost savings.

6. The method of claim 5, further comprising establishing, via a communications interface operably connected to the processor, a connection between the first printing device and at least one computing device.

7. The method of claim 6, further comprising transmitting the at least one energy cost savings to the at least one computing device.

8. The method of claim 7, wherein displaying the at least one energy cost savings comprises displaying the at least one energy savings on the at least one computing device.

9. A printing device for determining and displaying energy saving information associated with the printing device, the printing device comprising:

a processor;

a power supply operably connected to the processor and configured to measure power consumed by the printing device and transmit a power value to the processor, the power value indicative of the power consumed; and a computer-readable non-transitory storage medium operably connected to the processor, wherein the computer-readable non-transitory storage medium contains a set of instructions that, when executed, instruct the processor to:

receive the power value from the power supply, determine a first energy usage by the printing device for processing the document in a normal operating mode based upon the power value, determine an estimated energy usage by the first printing device for processing the document in each of a plurality of energy savings modes, wherein the plurality of energy saying modes comprise a low speed operating mode, a batch printing mode, and an economy print mode, determine and display an estimated energy saving for each of the plurality of energy saving modes, receive a user selection of one of the energy saving modes for processing the first document, process the document in the user-selected energy saving mode, receive an actual power value from the power supply indicative of an actual power amount consumed by the printing device for processing the document in the user-selected energy saving mode, determine at least one actual energy usage that was consumed by the printing device for processing the document in the user-selected energy saving mode based upon the actual power value, compare the first energy usage and the at least one actual energy usage, determine at least one actual energy cost savings based upon the comparison for processing the document at the printing device using the user-selected energy saving mode and a per-unit energy cost, and cause the at least one actual energy cost savings to be displayed.

10. The printing device of claim 9, further comprising a communications interface operably connected to the processor and configured to establish an operable connection to at least one computing device.

11. The printing device of claim 10, wherein the set of instructions is further configured to instruct the processor to transmit the at least one energy cost savings to the at least one computing device.

12. The printing device of claim 11, wherein the at least one energy cost savings is displayed on the at least one computing device.

* * * * *